J. A. BARBOUR.
VALVE.
APPLICATION FILED NOV. 21, 1910.
1,024,876.
Patented Apr. 30, 1912.
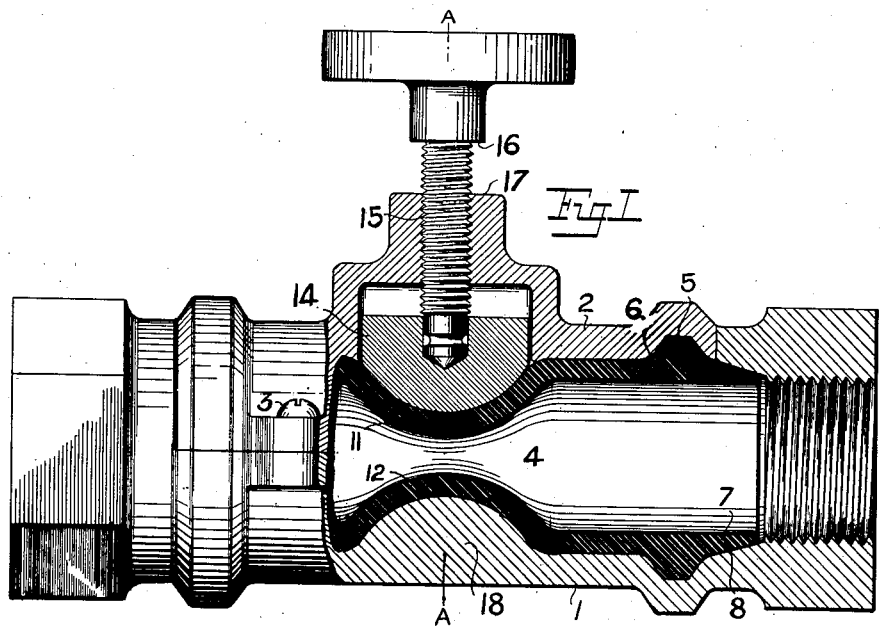
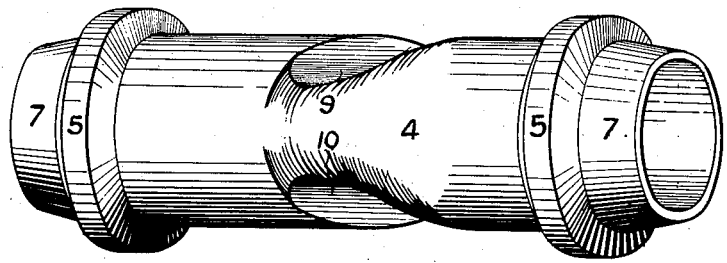
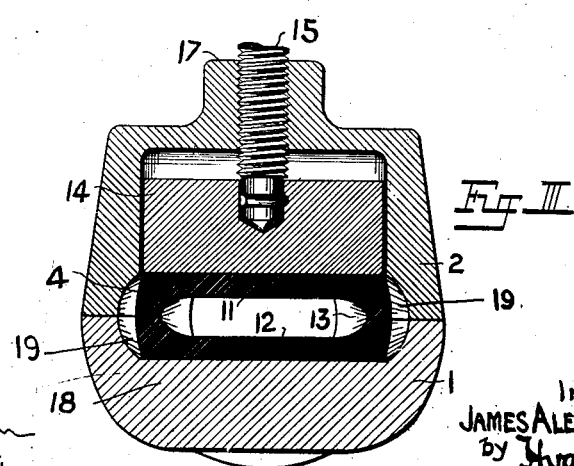
WITNESSES.
INVENTOR,
JAMES ALEXANDER BARBOUR.
by
Attorney.

UNITED STATES PATENT OFFICE.

JAMES A. BARBOUR, OF JOHANNESBURG, TRANSVAAL.

VALVE.

1,024,876.  Specification of Letters Patent.  Patented Apr. 30, 1912.

Application filed November 21, 1910. Serial No. 593,466.

*To all whom it may concern:*

Be it known that I, JAMES ALEXANDER BARBOUR, solicitor, a British subject, residing at 17 Robinson Buildings, Commissioner street, Johannesburg, Transvaal, have invented new and useful Improvements in Valves, of which the following is a specification.

The present invention provides a straight-flow valve characterized by simplicity of construction.

While the wear or deterioration of the valve by use is very small, the single part subject to wear may be readily and cheaply renewed when necessary. A special utility of the valve resides in its capacity to withstand the action of corrosive or abrasive fluid or semi-fluid matter.

The invention is illustrated in the accompanying drawing, in which:

Figure I is a longitudinal partly sectioned view of the valve complete; Fig. II is a separate view of the liner hereafter described; and Fig. III is a transverse section on the plane A—A Fig. I.

1 represents a rigid metallic valve casing having a detachable section or cover 2 which is shown as being retained in place by screws 3. The casing is suitably formed at its ends for attachment where required. The casing contains a removable hollow liner 4 made of rubber or similar resilient material, which provides the regulatable passage for fluid through the valve. The liner is of substantially tubular shape and fits for the most part closely to the similarly shaped interior of the casing so that the latter sustains it against internal pressure. It is inserted into the casing through the aperture provided by the removable section or cover 2.

5 indicates flanges formed externally upon the liner, which fit into recesses 6 in the casing. One function of these flanges is to secure the liner against endwise movement in the casing and particularly to prevent the ends of the liner from being pulled inward toward the center when the latter is compressed as hereafter mentioned. The ends 7 of the liner are tapered and fit into conical recesses 8 in the casing. The flanges 5 are made rather larger in diameter than the recesses 6 so that upon the cover 2 being fixed down it compresses flanges 5 circumferentially and thereby forces the ends 7 outward. Such ends are thus wedged tightly into the conical recesses 8 and make fluid-tight joints with the casing. Centrally the liner is adapted to be compressed, to close,— more or less completely as required,—the passage-way through it. To this end, it is flattened above and below at 9, 10, and is usually also broadened or bulged laterally in order to maintain a uniform size of bore throughout the valve when open. The bore at the point of compression is suitably shaped so that the walls may come together readily and evenly and with comparatively little movement of the compressing device. For this purpose, in the example shown, the top 11 and bottom 12 of the bore are flattened and are joined by sharply curved oval ends 13. The bore between the tubular ends and the flattened central portion thereof is fairly curved in order to permit free flow of fluid without eddying, which is one of the main advantages of a straight-way valve.

Any appropriate contrivance is fitted to compress the liner for the purpose of controlling the passage thereof, such as the pad 14 attached to and actuated by the screw 15. The screw is formed with a shoulder 16 which by coming into contact with the boss 17 of the casing prevents the pad being forced down to such an extent as to rupture the liner.

An enlargement 18 on the side of the casing extends up into the hollow on the underside of the liner to form an abutment upon which to compress the latter. The casing is spaced away at 19 from the liner to allow for lateral expansion of the latter when being compressed.

I claim, in a valve:—

1. The combination with a divided casing of a hollow resilient liner providing the passage for fluid through the valve, said casing providing surfaces opposing outward movement of the ends of the liner and against which the liner abuts to make fluid tight joints between itself and the casing, the liner being initially greater in diameter than the interior of the casing whereby closure of the casing forces the liner against said surfaces and means for compressing a part of the liner to control the area of the passage.

2. The combination with a divided casing of a hollow resilient liner removably positioned therein providing the passage for fluid through the valve, the liner being formed with tapered ends and the casing with corresponding conical surfaces, the liner being initially larger than the cavity of the casing and being circumferentially compressed by closure of the latter, whereby its tapered ends are forced endwise into jointing engagement with the conical surfaces of the casing.

3. A resilient liner for a valve of the kind herein specified of substantially tubular form having external retaining flanges and provided with outwardly tapered ends beyond the flanges for jointing with a casing and flattened at a median compressing point.

In testimony whereof I have signed my name to this specification in the presence of two subscribing witnesses.

J. A. BARBOUR.

Witnesses:
W. HILLMAN VINCENT,
WESLEY E. JOHN.